(No Model.)
G. B. WIGGIN.
PROCESS OF OXIDIZING OILS OR OTHER LIQUIDS.
No. 396,636. Patented Jan. 22, 1889.
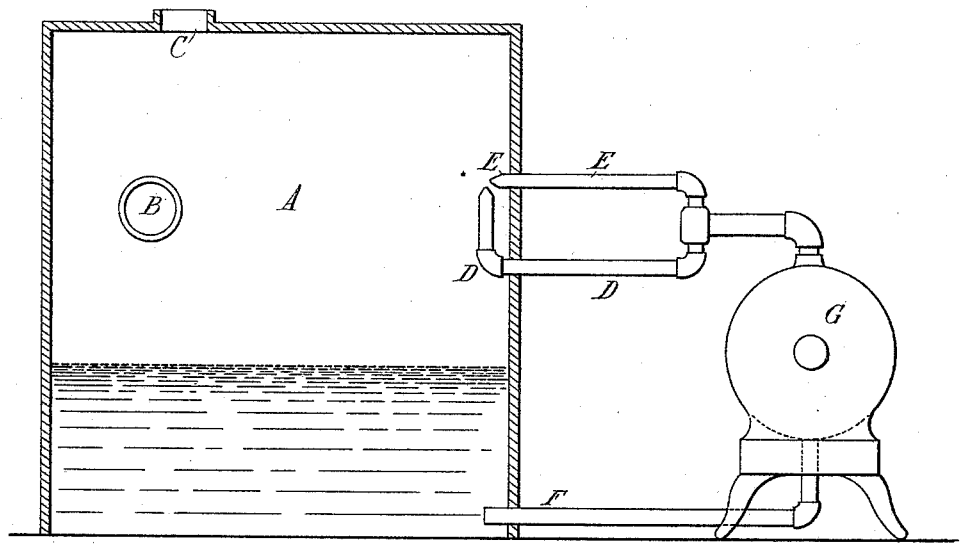
Witnesses.
Will T. Norton
Chas. Rhodes.
Inventor
George B. Wiggin
By his Attorneys
John J. Halsted & Son

UNITED STATES PATENT OFFICE.

GEORGE B. WIGGIN, OF SOUTH NEWMARKET, NEW HAMPSHIRE.

PROCESS OF OXIDIZING OILS OR OTHER LIQUIDS.

SPECIFICATION forming part of Letters Patent No. 396,636, dated January 22, 1889.

Application filed October 21, 1887. Serial No. 253,009. (No specimens.)

*To all whom it may concern:*

Be it known that I, GEORGE B. WIGGIN, of South Newmarket, in the county of Rockingham and State of New Hampshire, have invented certain new and useful Improvements in the Process of Oxidizing Linseed-Oil or other Oils or Liquids; and I do hereby declare that the following is a full, clear, and exact description of the invention, which will enable others skilled in the art to which it appertains to make and use the same, reference being had to the accompanying drawing, and to letters of reference marked thereon, which form a part of this specification.

My invention consists in oxidizing linseed-oils or other oils or liquids by forcing the same in finely-divided particles into a body of air which is being continually renewed.

In my improved process air is being constantly renewed in the vessel in which the oil is to be oxidized, and the oxidation is accomplished by atomizing or breaking the oil into finely-divided particles into this body of renewed air by means of two currents of the oil striking against each other.

It has been found by experience that in oxidizing by a powerful blast of air very satisfactory results are produced; but a great deal of the oil is wasted by being carried up into the air-outlet pipe in the top of the vessel and dissipated in the outside air by this necessary powerful air-blast. By my invention all this waste is saved, as the air, being in an almost quiescent state in the vessel, will not have the power to carry the finely-divided particles of the oil away.

In the drawing, by way of illustrating a means for practicing my invention, I have shown in the figure an apparatus adapted therefor.

A is a tank or vessel in which the oil or other liquid is to be oxidized.

B is the air-inlet, and C the air-outlet in the top of the vessel.

D and E are two oil-atomizer tubes which are connected to a pump, G, or any other means for forcing the oil through the tubes.

F is a suction-pipe at the bottom of the vessel A, also connected with the pump or other forcer G.

The oil is poured into the vessel A, and its surface is below the air-inlet B. The air is being continually renewed in the vessel without being forced, or with only a slight force, from its entrance B to its exit C. The pump being put into operation, the oil is sucked through the pipe F and forced through the tubes D and E and out into the air in the vessel in finely-divided particles, as in a spray or fog, and will very shortly begin to oxidize. There will be a continuous circulation of the oil from the vessel, suction-pipe, and atomizer-tubes D and E until the pump has ceased to operate or until the oil has been reduced to a gum.

It is evident from the above that if the process be continued long enough every particle of the oil in the vessel will be forced into the body of the air in finely-divided particles over and over again until the oxidation is complete.

It will be observed that the propelling-power which forces or drives forward the current of oil, and which discharges it into the tank or vessel in a finely-comminuted or broken-up condition, is applied directly to the oil and at a point behind such current and discharging-point, and therefore the action is widely different from former processes, in which the air contained in the tank enters from a blast or is agitated by paddles, or where paddles serve to mix the oil and air.

By my improved process I have found that oxidation is accomplished in a much shorter time, with less waste, and more completely and perfectly than by any process heretofore known.

Any form of sprinkler or atomizer or any power to force the liquid through the tubes can be used.

What I claim as new, and desire to secure by Letters Patent, is—

1. The process of oxidizing linseed-oil and other oils and liquids by forcing the same alone in finely-divided particles into a body of air which is being constantly renewed, substantially as described.

2. The process of oxidizing linseed-oil and other oils and liquids by breaking the same into finely-divided particles by means of two currents of the oil or liquid striking against each other in a body of air which is being constantly renewed.

GEORGE B. WIGGIN.

Witnesses:
CHARLES E. ATWOOD,
WILLIAM B. MERRILL.